United States Patent [19]

Kretschmer et al.

[11] Patent Number: 4,673,206
[45] Date of Patent: Jun. 16, 1987

[54] MOTOR VEHICLE WITH AN AIR GUIDANCE DEVICE ARRANGED IN THE BODY

[75] Inventors: Helmut Kretschmer, Bessenbach; Manfred Hochkoenig, Moeglingen, both of Fed. Rep. of Germany

[73] Assignee: Dr. Ing. h.c.F. Porsche Aktiengesellschaft, Fed. Rep. of Germany

[21] Appl. No.: 900,815

[22] Filed: Aug. 27, 1986

[30] Foreign Application Priority Data

Aug. 27, 1985 [DE] Fed. Rep. of Germany ....... 3530494

[51] Int. Cl.⁴ ............................................. B62D 37/02
[52] U.S. Cl. ....................................................... 296/1 S
[58] Field of Search ......................................... 296/1 S

[56] References Cited

U.S. PATENT DOCUMENTS 4,460,213 7/1984 Janssen et al. ....................... 296/1 S
4,486,046 12/1984 Whitney et al. ..................... 296/1 S

FOREIGN PATENT DOCUMENTS 710241 6/1946 Fed. Rep. of Germany.
890462 1/1954 Fed. Rep. of Germany.
2517273 6/1983 Fed. Rep. of Germany.
3245410 6/1984 Fed. Rep. of Germany.

Primary Examiner—Robert R. Song
Attorney, Agent, or Firm—Barnes & Thornburg

[57] ABSTRACT

For improving the air drag coefficient of a motor vehicle, discharge openings for a first air stream are provided in a cover part of the vehicle underside directly in front of and exclusively within the area of the wheels; the first air stream is conducted through an air guidance device arranged on the body side whereby a device for reducing the flow velocity of the first air stream is provided inside of the air guidance device. The first air stream has a smaller kinetic energy within the area of the discharge opening than the second air stream which flows through the space between the vehicle underside and the road surface.

18 Claims, 6 Drawing Figures

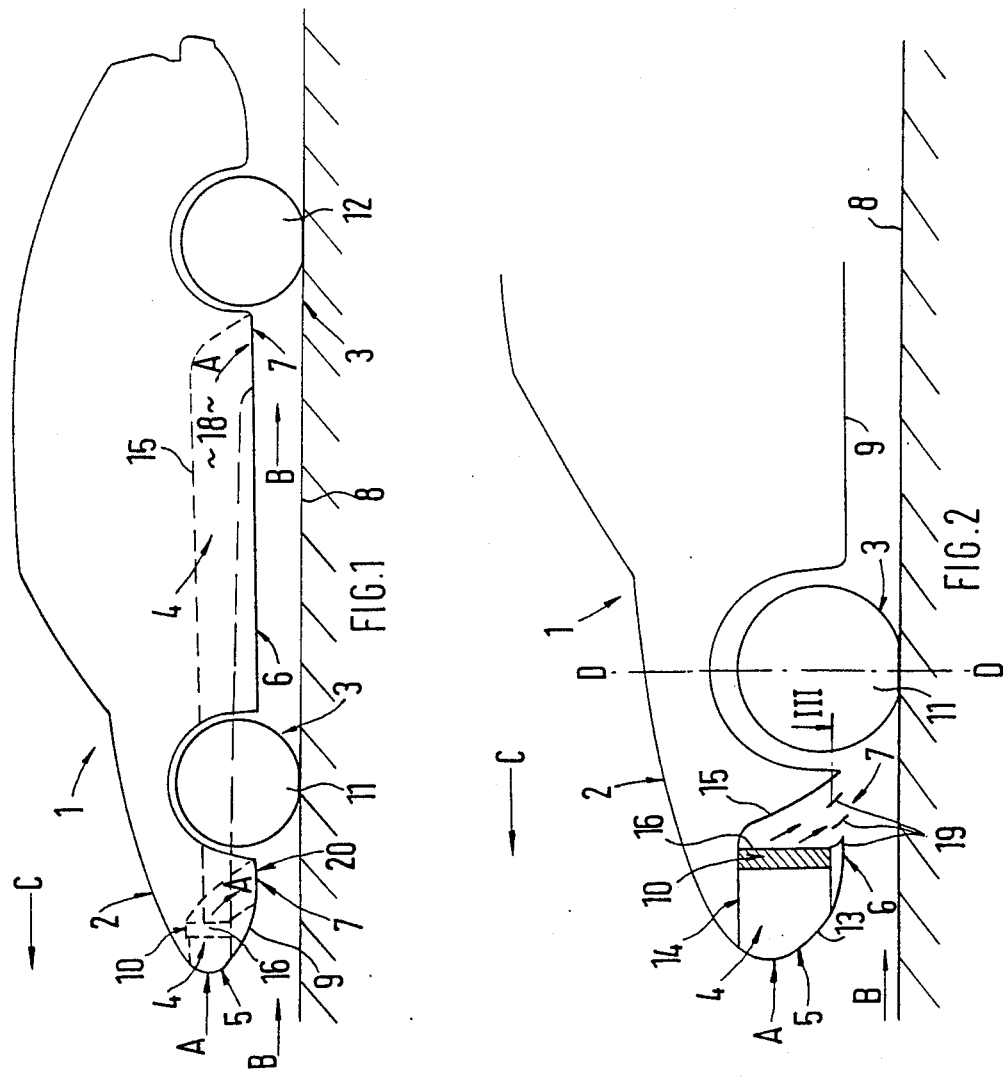

MOTOR VEHICLE WITH AN AIR GUIDANCE DEVICE ARRANGED IN THE BODY

The present invention relates to a motor vehicle with an air guidance device arranged in the body for a first air stream which reaches the air guidance device by way of an inlet opening provided in front of or to the rear of the wheels and leaves the same by way of an outlet opening provided at the vehicle underside, whereby the first airstream combined with a second air stream that flows through the space between the vehicle underside and the road surface.

In a known motor vehicle of the aforementioned type (German Pat. No. 890,462), the outlet opening of the first air stream is arranged, as viewed in the vehicle longitudinal direction, approximately within the area of the front axle plane, and more particularly adjacent a vehicle longitudinal center plane. This arrangement entails the disadvantage that at least a partial stream of the second air stream which flows in from in front into the area between road surface and body part, flows directly onto the wheels, whereby strong turbulences occur which increase the air drag coefficient.

It is known from the German Pat. No. 710,241 to arrange in a vehicle in front of the wheel deflection bodies which guide the inflowing air past the wheels. This arrangement is disadvantageous in that the deflection bodies cannot be so constructed by reason of the ground clearance necessary for the good functioning of the vehicle, respectively, by reason of the overhang angle, as would be required for a noticeable improvement of the air drag coefficient. For, the deflection bodies are the more effective the smaller the distance between the deflection bodies and the road surface. Additionally, an additional expenditure is required for the manufacture and assembly of the deflection bodies.

It is the object of the present invention to undertake such measures in a vehicle that the wheels of the vehicle are effectively circumcirculated while maintaining the predetermined ground clearance.

The underlying problems are solved according to the present invention in that the outlet or discharge openings are provided at a cover part of the vehicle underside, and more particularly directly in front of and exclusively within the area of the wheels whereby a device for the reduction of the flow velocity of the first air stream is provided inside of the air guidance device so that the first air stream has a smaller kinetic energy within the area of the discharge opening than the second air stream flowing through the space between vehicle underside and road surface.

The advantages principally achieved with the present invention reside in that as a result of the position of the outlet or discharge openings of the first air stream directly in front of and exclusively within the area of the wheels and as a result of the reduction of the flow velocity of the first air stream ahead of the outlet or discharge opening, an effective circumcirculation of the wheels and therewith a reduction of the air drag coefficient takes place. This is achieved in that the first air stream passing through the discharge openings has a small kinetic energy that the second air stream. However, a higher pressure level exists in the first air stream than in the second air stream, i.e., the first air stream forms a guide-body-like cushion. The deflection bodies customary heretofore can be dispensed with.

A further advantage of the arrangement according to the present invention consists in that the first air stream already exists by reason of the throughflow through the radiator which is customary with most vehicles.

These and other objects, features and advantages of the present invention will become more apparent from the following description when taken in connection with the accompanying drawing which shows, for purposes of illustration only, serveral embodiments in accordance with the present invention, and wherein:

FIG. 1 is a schematic side elevational view of a passenger motor vehicle in accordance with the present invention;

FIG. 2 is a partial side elevational view, on an enlarged scale, of the passenger motor vehicle of FIG. 1, shown partly in cross section;

Figure 3:
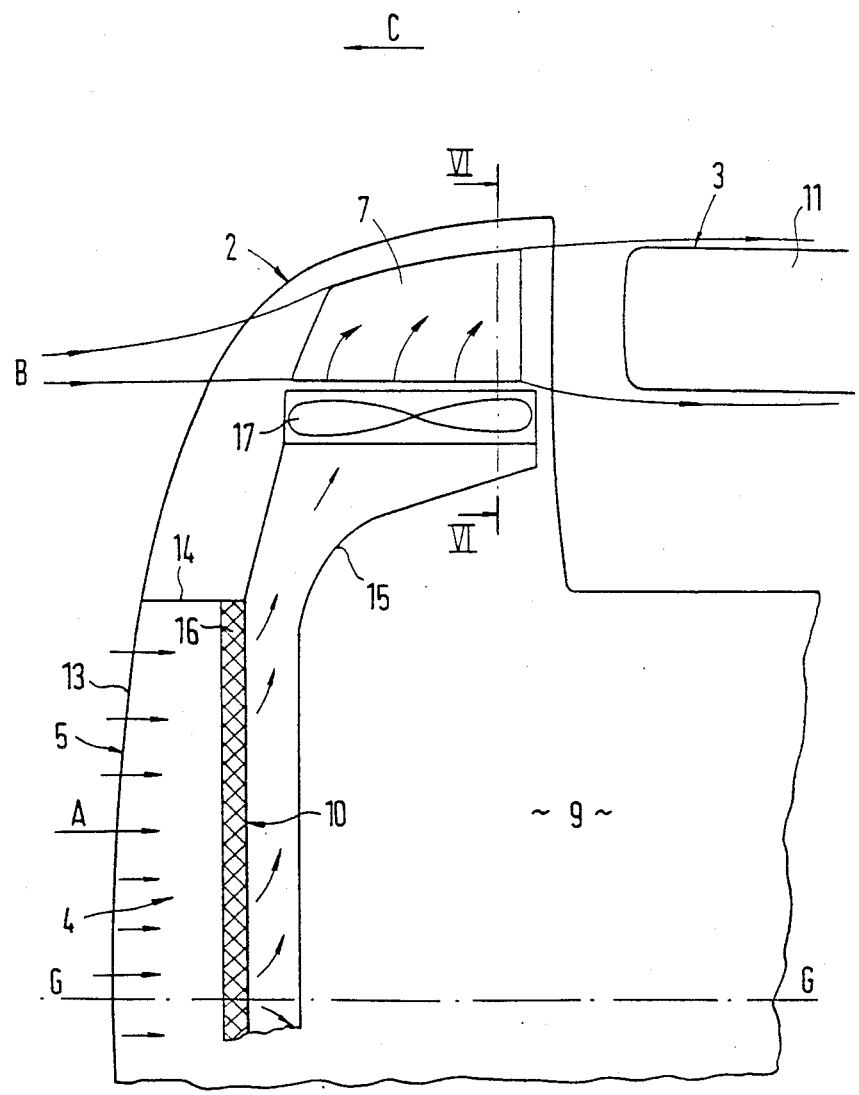
FIG. 3 is a cross-sectional view of an enlarged scale, taken along line III—III of FIG. 2.

Referring now to the drawing wherein like reference numerals are used throughout the various views to designate like parts, the motor vehicle 1 illustrated by a passenger motor vehicle includes a body 2 and wheels 3. An air guidance device 4 for a first air stream A is arranged inside of the body 2. The first air stream A enters the air guidance device 4 by way of an inlet opening 5, flows through the same and is conducted to a discharge opening 7 provided at a vehicle underside 6. Thereafter, the first airstream A is combined with a second airstream B flowing through the space between the vehicle underside 6 and a road surface 8.

In order that the second air stream B can flow turbulence-low between the vehicle underside 6 and the road surface 8, the vehicle underside 6 is provided with an aerodynamically constructed smooth-surfaced body cover part 9. Preferably, the cover part 9 extends over the entire vehicle length. However, the possibility also exists to arrange the cover part 9 only in front of a front axle plane D—D, as viewed in the driving direction C. The cover part 9 is formed by a covering for the vehicle underside, a front-end apron or the like.

In order to avoid a direct flow by the second air stream B against the wheels 2, the discharge openings 7 for the first air stream A which are arranged according to the present invention in the cover member 9, are provided directly in front of and exclusively within the area of the wheels 3. A device 10 for reducing the flow velocity of the first air stream A is arranged inside of the air guidance device 4 so that the first air stream A has a smaller kinetic energy downstream of the discharge opening 7 than the second air stream B passing through the space between the vehicle underside 6 and the road surface 8. However, a higher pressure level exists in the first air stream A than in the second air stream B, i.e., the first air stream A forms a guide-body-like or baffle-like cushion in front of the wheels 3, about which the second air stream B slides past laterally.

According to FIG. 1, a discharge opening 7 is provided in front of each wheel 3 of the passenger motor vehicle, i.e., in front of both front wheels 11 and the rear wheels 12. In FIG. 2, in contrast, discharge openings 7 are provided only in front of the two front wheels 11.

Each discharge opening 7 has a greater width adjacent the adjoining wheel 3 than in a more forwardly disposed area, as viewed in the driving direction C.

The greatest width E of the discharge opening 7 is to correspond approximately to the width F of the wheel 3. A good circumcirculation of the wheels 3 is achieved, for example, in that the discharge opening 7 is constructed approximately triangularly shaped, as viewed in plan view, in such a manner that the width of the discharge opening 7 becomes continuously larger opposite the driving direction C. The discharge opening 7, however, may also be constructed semi-circularly shaped, eliptically shaped, trapezoidally shaped or the like.

The inlet opening 5 is arranged corresponding to FIGS. 1 to 4 at a front end part 13 of the body 2, and more particularly within an area of relatively high ram or dynamic pressure so that even with small dimensions of the inlet openings 5, always a sufficient quantity of air reaches the air guidance device 4. The air guidance device 4 extends between the inlet opening 5 and the respective discharge openings 7 and is formed by channels 14 on the side of the body, channel-shaped assembly parts 15 or by a combination of the two aforementioned elements 14 and 15. A separate channel 14, respectively, channel-shaped assembly part 15 is coordinated to each discharge opening 7.

According to FIGS. 1 to 4, a radiator 16 is arranged inside of the air guidance device 4 through which the first air stream A is conducted. As a result thereof, a reduction of the flow velocity of the first air stream A is attained. The radiator 16 serves, for example, for cooling an internal combustion engine (not shown). According to FIGS. 1 to 3, the radiator 16 is installed transversely to the vehicle longitudinal direction whereas in FIG. 4, two lateral outwardly disposed radiators 16 arranged at a distance to a vehicle longitudinal center plane G—G are provided which extend approximately parallel to this plane.

Figure 4:
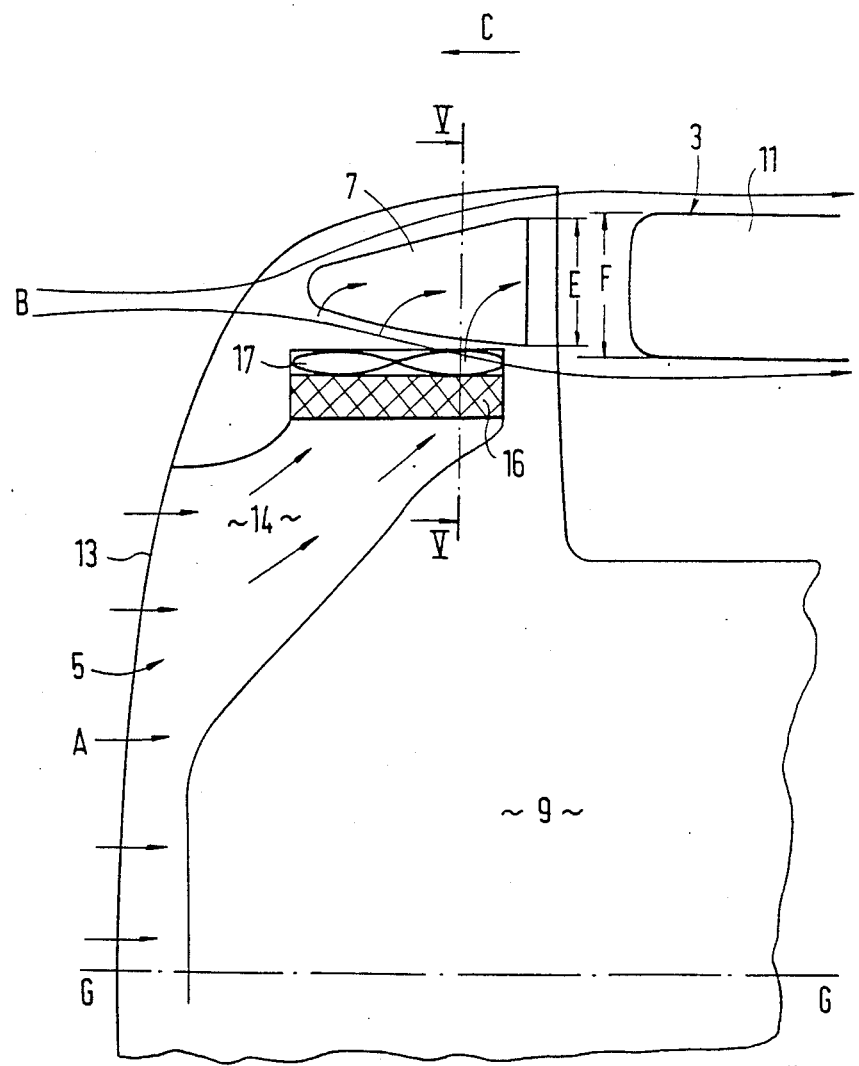
FIG. 4 is a cross-sectional view corresponding to FIG. 3, but with the radiator aligned in the vehicle longitudinal direction.

In FIGS. 2 to 4, a fan 17 is arranged downstream of each radiator in order that a sufficient admission of the radiator 16 with cooling air is assured also at low vehicle velocity. In lieu of a radiator 16, the air guidance device 4 may also include a cross-sectional enlargement 18 upstream of the discharge opening 7 so that a reduction of the flow velocity is achieved in this manner.

Furthermore, the possibility exists to arrange guide elements 19 within the area of the discharge opening 7 by means of which the first air stream A is deflected early in the flow direction of the second air stream B. However, a circumcirculation of the front wheels 11, caused by the second air stream B, also takes place when no guide elements 19 are provided.

Figure 5:
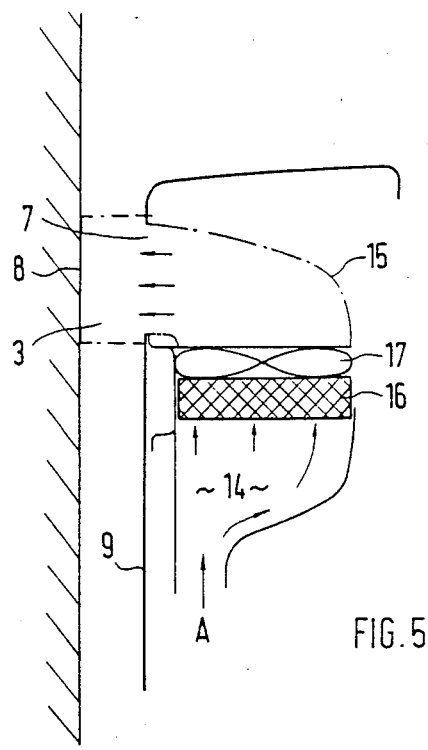
FIG. 5 is a cross-sectional view, taken along line V—V of FIG. 4.
Figure 6:
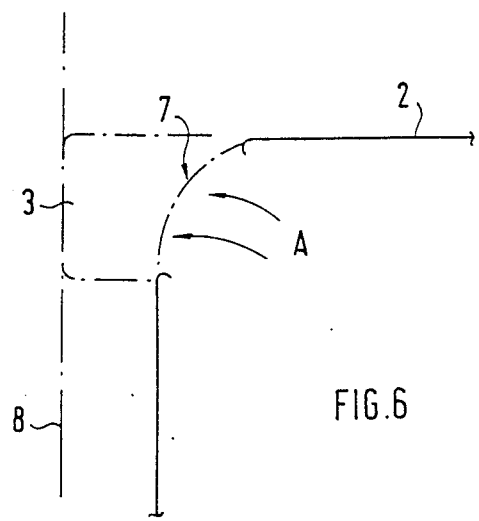
FIG. 6 is a cross-sectional view, taken along line VI—VI of FIG. 3.

As shown in FIG. 1, the cover part 9 has—as viewed in the vehicle longitudinal direction—an approximately horizontally directed configuration 20 within the area of the discharge opening 7. As viewed in the vehicle transverse direction, the cover part 9 may be constructed in the area of the discharge opening 7 either horizontally (FIG. 5) or rounded-off (FIG. 6) or extending at an inclination (not shown).

While we have shown and described several embodiments in accordance with the present invention, it is understood that the same is not limited thereto, but is susceptible of numerous changes and modifications as known to those skilled in the art, and we therefore do not wish to be limited to he details shown and described herein, but intend to cover all such changes and modifications as are encompassed by the scope of the appended claims.

We claim:

1. A motor vehicle comprising air guidance means for a first air stream arranged on the body, the first air stream reaching the air guidance means by way of inlet opening means and leaving the air guidance means by way of a discharge opening means provided in the vehicle underside, the first air stream being combined with a second air stream that flows through the space between the vehicle underside and the road surface, the discharge opening means being provided on a cover means of the vehicle underside directly ahead of and exclusively within the area of vehicle wheels, means on the inside of the air guidance means for reducing the flow velocity of the first air stream so that the first air stream has a smaller kinetic energy within the area of the discharge opening means that the second air stream flowing between the vehicle underside and the road surface.

2. A motor vehicle according to claim 1, wherein the discharge opening means are arranged exclusively in front of the two front wheels.

3. A motor vehicle according to claim 1, wherein the discharge opening means are provided in front of at least one of front wheels and rear wheels.

4. A motor vehicle according to claim 1, wherein the discharge opening means are provided in front of both front wheels and the rear wheels.

5. A motor vehicle according to claim 1, wherein each discharge opening means has a larger width adjacent the wheel than within an area located more forwardly as viewed in the driving direction.

6. A motor vehicle according to claim 1, wherein the greatest width of the discharge opening means has approximately the width of the adjoining wheel.

7. A motor vehicle according to claim 1, wherein the cover means is formed by one of underside cover means, front end apron means and the like.

8. A motor vehicle according to claim 7, wherein the cover means—as viewed in the vehicle longitudinal direction—has an approximately horizontally directed configuration within the area of the discharge opening means.

9. A motor vehicle according to claim 1, wherein the flow velocity reducing means is formed by a radiator through which the first air stream is conducted.

10. A motor vehicle according to claim 1, wherein the flow velocity reudicng means is formed by a cross-sectional enlargement of the air guidance means provided upstream of the discharge opening means.

11. A motor vehicle according to claim 1, wherein the discharge opening means is constructed approximately triangularly shaped, as viewed in plan view.

12. A motor vehicle according to claim 1, wherein the cover means—as viewed in the vehicle longitudinal direction—has an approximately horizontally directed configuration within the area of the discharge opening means.

13. A motor vehicle according to claim 3, wherein each discharge opening means has a larger width adjacent the wheel than within an area located more forwardly as viewed in the driving direction.

14. A motor vehicle according to claim 13, wherein the greatest width of the discharge opening means has approximately the width of the adjoining wheel.

15. A motor vehicle according to claim 14, wherein the discharge opening means is constructed approximately triangularly shaped, as viewed in plan view.

16. A motor vehicle according to claim 14, wherein the cover means—as viewed in the vehicle longitudinal direction—has an approximately horizontally directed configuration within the area of the discharge opening means.

17. A motor vehicle according to claim 16, wherein the flow velocity reducing means is formed by a radiator through which the first air stream is conducted.

18. A motor vehicle according to claim 16, wherein the flow velocity reducing means is formed by a cross-sectional enlargement of the air guidance means provided upstream of the discharge opening means.

* * * * *